June 11, 1963  J. W. McCOLLUM  3,093,394
CONVERTIBLE HITCH
Filed Jan. 3, 1961
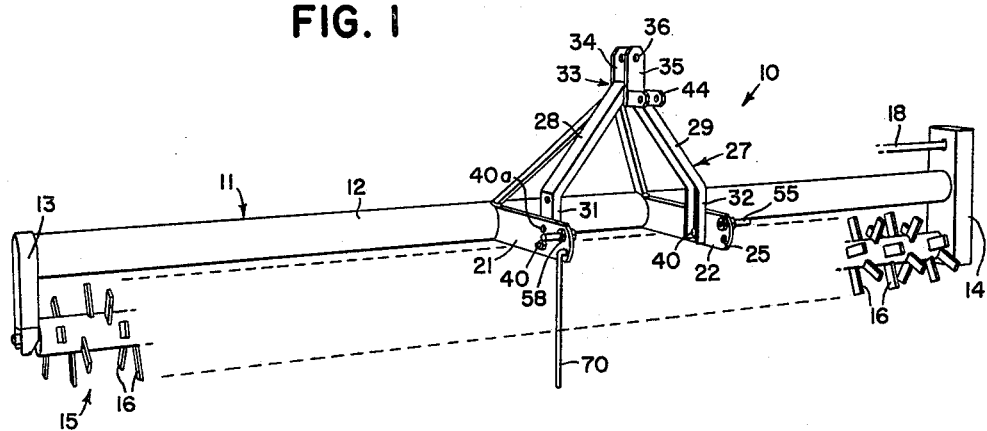
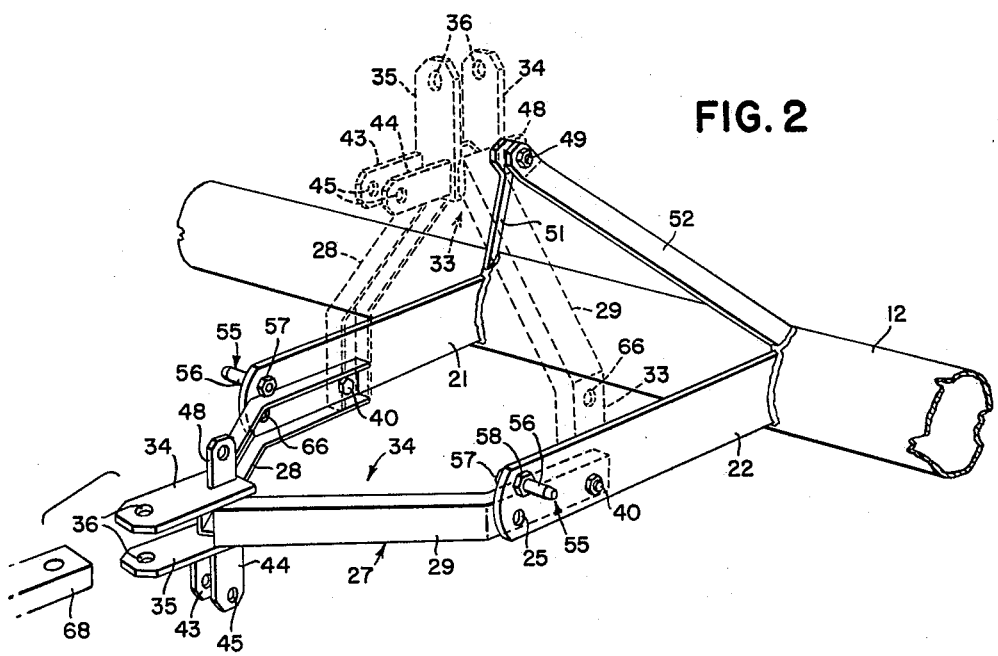
INVENTOR.
JACK W. MC COLLUM
BY
Roger C. Johnson
ATTORNEY

3,093,394
CONVERTIBLE HITCH
Jack W. McCollum, Boise, Idaho, assignor of one-half to Deere & Company, Moline, Ill., a corporation of Delaware
Filed Jan. 3, 1961, Ser. No. 80,180
10 Claims. (Cl. 280—415)

This invention relates generally to agricultural machines and more particularly to its devices associated therewith for connecting the agricultural implement to a farm tractor.

Most agricultural implements in use today are either a trailing type where the implement is simply pulled behind a tractor, or a tractor-mounted type where the implement is supported entirely on the tractor during transport and generally also during operation. In the former type, the implement is easily connected with the drawbar of the tractor by means of a single hitch pin, and in the latter type many implements are equipped to be used with what is termed a 3-point hitch such as is shown, for example, in the U.S. Patent 2,223,002, issued November 26, 1940 to H. G. Ferguson. Briefly, the 3-point hitch arrangement includes an upper or compression link and a pair of lower draft links connected at the forward ends for more or less universal movement with the tractor and similarly connected at their rear ends with the implement, the tractor including hydraulic power means or the like connected with the lower links for raising and lowering the implement relative to the tractor.

The object and general nature of this invention is the provision of hitch mechanism that may, with minimum adjustment, be arranged to connect an implement to either of the above mentioned types of tractors; that is, the implement equipped with a hitch device of this invention may be connected in trailing relation with the conventional drawbar of a tractor or with the 3-point hitch linkage of a tractor.

Specifically, it is a feature of this invention to provide implement hitch mechanism of the type that includes a hitch part that is adapted to be fixed to the implement in either of two optional positions, one position accommodating ready attachment of an implement to the drawbar of a tractor where the implement is of the towed or trailing type, the other position of the part being one in which implement is connected to the upper and lower links of the 3-point hitch linkage of the tractor.

These and other objects and advantages of this invention will be apparent to those skilled in the art after a consideration of the following detailed description, taken in conjunction with the accompanying drawings in which:

FIG. 1 is a perspective view of an implement in which is incorporated hitch mechanism of this invention adjusted and arranged to connect the implement to a tractor having a 3-point type of hitch linkage.

FIG. 2 is a perspective view similar to FIG. 1 but illustrating in full lines the hitch mechanism of this invention arranged to be connected to the drawbar of a tractor with the implement in towed or trailing relation with respect to the tractor. Arrangement of the hitch for 3-point linkage is shown in dotted lines.

The implement is indicated in its entirety by the reference numeral 10 and for purposes of illustration is shown as a rotary bedder that includes a frame 11 made up of a transverse pipe 12 secured as by welding, to the end members 13 and 14, the lower portions of which extend below the pipe 12. The lower portions of the members 13 and 14 support suitable bearing means (not shown) by which an element 15 is supported for rotation relative to the frame 11.

The element 15 includes soil working teeth 16 that may be of any suitable construction. If desired, the member 15 may be connected to be operated by power derived from the tractor, but the means for delivering the power from the tractor power take-off shaft to the rotary member 15 has not been illustrated since it per se does not form any part of this invention. It will therefore suffice to note that the end member 14 is extended above the pipe 12 and encloses gearing and a means by which the member 15 may be driven from a transverse shaft 18, shown fragmentarily in FIG. 1. Power may be transmitted from the power take-off shaft of a tractor to the shaft 18 by any suitable means.

The frame 11 includes a pair of forwardly extending frame plates 21 and 22 that at their rear portions are welded to the central portion of the pipe 12. The frame plates or bars 21, 22, which form an auxiliary frame section, extend forwardly in a generally horizontal plane and are apertured, as in 25, at a plurality of points adjacent to the forward ends of the bars 21 and 22.

Swingably supported on the forward portions of the bars 21 and 22 is an A-frame 27 that is made up of two channel members 28 and 29 shaped to the configuration shown. A-frame 27 thus includes lower spaced-apart portions, formed by vertical sections 31 and 32 of the channel member 28 and 29, and an upper apical portion 33 that is formed by bringing the upper portions of the channels 28 and 29 close together and welding a pair of apertured plates 34 and 35 thereto. The outer ends of the plates 34 and 35 are apertured, as at 36. The spaced apart portions 32 and 33 are suitably connected with the frame members 21 and 22 by means of a pivot bolt 40, and, as will be seen from FIG. 2, the A-frame 27 may be disposed in a generally horizontal plane, generally coinciding with the horizontal plane containing the frame members 21 and 22, or the A-frame 27 may be swung about the pivot bolts 40 up to a generally vertical position, as shown in full lines in FIG. 1 and dotted lines in FIG. 2, in which position the plates 34 and 35 are disposed in a vertical position. Fixed to the normally lower plate 35 is a pair of forwardly extending lugs 43 and 44 that are apertured, as at 45. The purpose of these lugs 43 and 44 will be explained below.

When the A-frame 27 is in a vertical position, it is adapted to be fixed in that position by means of one or more rear lugs 48 apertured to receive a transverse bolt 49 that extends through the upper apertured ends of a pair of diagonal brace bars 51 and 52 that at their lower ends are welded to the implement frame pipe 12 adjacent the rear or attached ends of the horizontal frame bars 21 and 22. By removing the bolt 49, the hitch frame 27 may be swung outwardly about the bolts 40 as a center into a generally horizontal position, as shown in FIG. 2, full lines.

The forward ends of the frame bars 21 and 22 carry a pair of removable stud members 55. As shown in FIG. 2 the stud members are disposed in the upper of the front openings 25 in the bars 21 and 22, and each stud member includes a pin section 56, a head 57, and a removable nut 58 that is threaded onto an enlarged portion of the shank of the member 55 so that, by removing the nut 58, the stud member 59 may be disconnected when desired.

As will be seen from FIG. 1, the outwardly extending pin sections of the studs 55 are adapted to receive the lower hitch links of a tractor 3-point hitch linkage and the forwardly extending lugs 43 and 44 are adapted to receive a pin that forms a part of the means connecting the rear end of the upper link that forms a part of a tractor 3-point hitch linkage.

When the hitch means of this invention, previously arranged for a 3-point hitch linkage, is to be arranged for use as part of a hitch connecting a trailing or towed implement to the drawbar of a tractor, the studs 55 are moved from the front end of the frame bars 21 and 22 and the A-frame 27 is then disconnected from the braces 51 and 52 by removing the bolt 49. The A-frame is then swung downwardly into a generally horizontal position. The studs 55 are then reinserted in the front end of the bars 21 and 22, either by passing the studs 55 through the lower openings 25 and through the openings 66 formed in the channel sections 32 and 33, or by passing the studs 55 through the upper openings 25 in the bars 21 and 22. When the nuts 58 are tightener in this position of the A-frame 27, the latter is fixedly secured to the implement frame bars 21 and 22 in a generally horizontal position and in this position the hitch plates 34 and 35 are disposed in a horizontal position so as to readily receive the drawbar 68 of the tractor. The A-frame 27 may be fixed in a lower position by passing the studs 55 through the openings 66 and the upper openings 25.

As will be seen from the above description, it is a relatively simple matter to change the position of the A-frame 27 from a generally upwardly extending or vertical position, accommodating the connection of the tractor 3-point hitch links thereto, to a fixed and generally horizontal position, so as to readily be connected to the drawbar of the tractor, or vice versa. In the latter position, the implement is of the towed or trailing type, either supported upon its own ground-engaging tools or, if desired, upon ground wheels (not shown) that may be fixed in any suitable way to the frame 11 of the implement.

As shown in FIG. 1, a stand 70 may be connected to one of the studs 55 to hold the implement in an upright position when the implement is disconnected from the tractor.

While I have shown and described above the preferred structures in which the principles of this invention have been incorporated, it is to be understood that my invention is not to be limited to the particular details shown and described above, but, in fact, widely different means may be employed in the practice of the broader aspects of my invention.

What I claim, therefore, and desire to secure by Letters Patent is:

1. In an agricultural implement adapted to be connected optionally with a tractor having a drawbar for trailing implements or a tractor having upper and lower three-point hitch links, the improvement comprising a convertible hitch mechanism adapting the implement for attachment to either of said types of tractors, said hitch mechanism including generally horizontal frame means fixed to the implement and extending forwardly therefrom, means forming an A-frame pivoted to the forward portion of said generally horizontal frame means and swingable between a generally horizontal position, generally coplanar with said frame means, and a generally vertical position, means on the generally apical portion of said A-frame to receive the upper of said hitch links which extends forwardly when the A-frame is in its vertical position, means on the forward portion of said horizontal frame means to receive the lower of said hitch links, and means fixing said A-frame in either of its positions.

2. In an agricultural implement adapted to be connected optionally with a tractor having a drawbar for trailing implements or a tractor having upper and lower three-point hitch links, the improvement comprising a convertible hitch mechanism adapting the implement for attachment to either of said types of tractors, said hitch mechanism including generally horizontal frame means fixed to the implement and extending forwardly therefrom, means forming an A-frame pivoted to the forward portion of said generally horizontal frame means and swingable between a generally horizontal position, generally coplanar with said frame means, and a generally vertical position, means on the generally apical portion of said A-frame to receive the upper of said hitch links when the A-frame is in its vetrical position, means fixing said A-frame in either of its positions, and stud means carried on said horizontal frame means to receive the lower of said hitch links when said A-frame is in its generally vertical position.

3. In an agricultural implement having frame means, hitch means for connecting the implement to a tractor, said hitch means comprising an A-frame swingably connected with the implement frame means and shiftable between a generally horizontal position and a generally vertical position, means fixing the A-frame to the implement optionally in either of said positions, tractor drawbar receiving means fixed to said A-frame and extending generally forwardly when the A-frame is in its generally horizontal position, and link-receiving means fixed to said A-frame and extending generally forwardly when the A-frame is in its generally vertical position.

4. In an agricultural implement having frame means, hitch means for connecting the implement to a tractor, said hitch means comprising an A-frame swingably connected with the implement frame means and shiftable between a generally horizontal position to a generally vertical position, means connected with the implement frame means and attachable with the A-frame for holding the latter in a generally vertical position, and stud means detachably connected with the implement frame means and attachable to the A-frame for fixing the latter to said implement frame means in a generally horizontal position.

5. In an agricultural implement adapted to be connected optionally with a tractor having a drawbar for trailing implements or a tractor having upper and lower three-point hitch links, the improvement comprising a convertible hitch mechanism adapting the implement for attachment to either of said types of tractors, said hitch mechanism including generally horizontal frame means fixed to the implement and extending forwardly therefrom, means forming an A-frame pivoted to the forward portion of said generally horizontal frame means and swingable between a generally horizontal position, generally coplanar with said frame means, and a generally vertical position, said generally horizontal frame means being provided with a plurality of apertures on its forward portion, stud means passing through said apertures and adapted to receive said lower hitch links when the A-frame is in its generally vertical position, said stud means also being adapted to lock the A-frame in its generally horizontal position, and locking means mounted on the apical portion of said A-frame, said locking means being adapted to lock the A-frame in its generally vertical position.

6. The invention set forth in claim 5, in which a plurality of apertured plates are secured to the apical portion of said A-frame which, when the A-frame is in its generally horizontal position, extend forwardly and are adapted to be secured to the draw bar of a tractor, and in which a plurality of apertured lugs are secured to the apical portion of said A-frame which, when the A-frame is in its generally vertical position extend forwardly and are adapted to be secured to the upper of said hitch links.

7. In an agricultural implement adapted to be connected optionally with a tractor having a drawbar for trailing implements or a tractor having upper and lower three-point hitch links, the improvement comprising a convertible hitch mechanism adapting the implement for attachment to either of said types of tractors, said hitch mechanism including forwardly extending frame means fixed to the implement, and means cooperable with said frame means and swingable between a generally horizontal position and a generally vertical position, said last-mentioned means being provided with means to receive the upper link of the three-point hitch of the tractor only when said means is disposed in a generally vertical position 8. In an agricultural implement having frame means, hitch means for connecting the implement to a tractor, said hitch means comprising an A-frame swingably connected with the implement frame means and shiftable between a generally horizontal position and a generally vertical position, means fixing the A-frame to the implement optionally in either of said positions, and link receiving means fixed to said A-frame and extending generally forwardly when the A-frame is in its generally vertical position.

9. The invention set forth in claim 7 further characterized by stud means carried on said forwardly extending frame means to receive the lower of said hitch links when said swingable means is in its generally vertical position.

10. In an agricultural implement adapted to be connected optionally with a tractor having a drawbar for trailing implements or a tractor having upper and lower three-point hitch links, the improvement comprising a convertible hitch mechanism adapting the implement for attachment to either of said types of tractors, said hitch mechanism including forwardly extending frame means fixed to the implement, means cooperable with said frame means and swingable between a generally horizontal position and a generally vertical position, means on the side of the swingable means that faces forwardly when said swingable means is in a generally vertical position to receive certain of said hitch links to establish a draft connection between the tractor and said implement, means on the forward end portion of said swingable means when the latter is in its generaly horizontal position to establish a draft connection between the swingable means and said tractor drawbar, and means fixing said swingable means in either of its positions.

References Cited in the file of this patent

UNITED STATES PATENTS

| | | |
|---|---|---|
| 1,783,189 | Green | Dec. 2, 1930 |
| 2,378,504 | Roos | June 19, 1945 |
| 2,662,783 | Sawyer | Dec. 15, 1953 |

FOREIGN PATENTS

| | | |
|---|---|---|
| 922,021 | Germany | Jan. 5, 1955 |